(12) United States Patent
Dwyer

(10) Patent No.: US 7,755,476 B2
(45) Date of Patent: Jul. 13, 2010

(54) SYSTEM AND APPARATUS FOR SERVICING EQUIPMENT

(76) Inventor: Paul Dwyer, 2226 SW. 17th Pl., Cape Coral, FL (US) 33991

( * ) Notice: Subject to any disclaimer, the term of this patent is extended or adjusted under 35 U.S.C. 154(b) by 504 days.

(21) Appl. No.: 11/701,591

(22) Filed: Feb. 2, 2007

(65) Prior Publication Data

US 2008/0186195 A1 Aug. 7, 2008

(51) Int. Cl.
*G08B 1/08* (2006.01)
(52) U.S. Cl. .................. 340/539.1; 340/689; 33/366.24
(58) Field of Classification Search .............. 340/539.1, 340/686.1, 689; 33/366.11, 366.24, 366.12, 33/391
See application file for complete search history.

(56) References Cited

U.S. PATENT DOCUMENTS

| 4,565,010 | A | * | 1/1986 | Herman | .................... 33/366.24 |
| 5,673,491 | A | * | 10/1997 | Brenna et al. | ............ 33/366.24 |
| 6,526,668 | B1 | * | 3/2003 | Beckhart et al. | ......... 33/366.11 |
| 6,836,972 | B2 | * | 1/2005 | Drahos et al. | ............ 33/366.11 |
| 6,987,460 | B2 | * | 1/2006 | Tews et al. | ................... 340/689 |

* cited by examiner

*Primary Examiner*—John A Tweel, Jr.
(74) *Attorney, Agent, or Firm*—Alozie N. Entufugh

(57) ABSTRACT

A system and apparatus for determining the optimal servicing position for equipment or parts thereof. The system and apparatus of the present invention improves efficiency of equipment servicing, safety of mechanics or service persons and accuracy of determining various optimal servicing positions.

12 Claims, 3 Drawing Sheets

SYSTEM AND APPARATUS FOR SERVICING EQUIPMENT

TECHNICAL FIELD OF THE PRESENT INVENTION

The present invention relates generally to a system and apparatus for servicing equipment (or machinery) or parts thereof. More specifically, a system and apparatus for determining the optimal servicing position of a piece or portion of equipment.

BACKGROUND OF THE PRESENT INVENTION

Mechanical parts of equipment require periodic servicing to ensure reliable performance and longevity. One set of such equipment are final drives or planetary gears. Final drives are found on tractors, bulldozers and other heavy equipment. They are a series of gears enclosed in a case in which power from the transmission or hydrostatic motors transfer torque to the drive wheels or tracks of heavy equipment. The final drive can be a torque multiplier used to handle large torque forces. As a result, these gears must be lubricated at all times using specific amounts of fluid according to manufacturer recommendations. Thus to ensure the proper functioning of the final drive regular servicing is required, which further entails checking the fluid levels, sampling, changing and filling the final drive with lubricating fluid.

Usually, the manufacturer places a marker e.g. a visible line on the final drive of the wheel indicating where the optimal fluid level should be. Generally, the manufacturer's marker is horizontal to the ground when viewed with the wheel mounted in an upright position. For several final drives, this marker is at half way across the final drive or at a position lower than half way across the final drive. In certain heavy equipment, which may require more lubricating fluids, the marker may be at the three-quarter mark across the final drive. Thus, when the final drive is being serviced, there exists a need to have the wheel properly rotated to the exact position in perfect alignment with the manufacturer's marker. In certain instances, that desired position is where the manufacturer's marker is perfectly horizontal to the ground so that the fluid levels can be checked or otherwise serviced.

Such servicing of final drives entails the correct positioning of the wheels on which they are located. Because of the servicing requirements for the final drive system, the frequency of servicing and the necessity for precision, the machine or heavy equipment would have to be moved multiple times until it is in the correct or optimal position for servicing. This process usually requires at least one mechanic observing the position of the equipment being serviced to ensure that the final drive is in its desired or optimal position while another mechanic moves the equipment backwards and/or forward until the wheel is properly rotated to the desired position. Alternatively, a mechanic may single-handedly service the equipment but it will require multiple entrances and exits to and from the equipment's cab as he or she verifies that the optimal position has been achieved. This results in wasted time, inefficiency, decreased productivity and safety because of the trial and error nature of positioning the machine or equipment. This also presents a safety concern as there are more opportunities for accidents with the constant entering and exiting of the equipment's cab. Thus there exists a need to improve the efficiency and safety of the mechanics servicing the equipment or parts thereof. Similarly, there exists a need to determine with accuracy and precision when the desired optimal servicing position of the equipment, or parts thereof, is achieved or attained.

The new system and apparatus as embodied by the present invention eliminates the need for a mechanic to repeatedly exit a vehicle to gauge the position of the final drives before servicing them. Similarly, the present invention eliminates the need for additional manual assistance in determining the proper position for servicing the equipment. A mechanic using the system and apparatus of the present invention will no longer need to repeatedly exit and enter the equipment's cab in order to verify the correct position of the final drives. The mechanic will be able to unilaterally determine when the wheel being serviced is in the desired position without having to exit the equipment's cab. The system and apparatus envisioned in the present invention will thus increase productivity and safety. In addition, the system and apparatus envisioned in this invention will increase the accuracy of the desired position of the final drive. It should be noted that the system and apparatus envisioned in this invention may also be used for other equipment parts that require certain positioning for servicing or other activities and that the discussion of final drives was solely illustrative.

BRIEF DESCRIPTION OF THE INVENTION

Generally, it is an object of this present invention to provide a system and apparatus for servicing equipment or parts thereof, which comprises of two major components—a transmitter and a receiver component. The transmitter component comprises of a position determining means, a signal generation means and a signal transmission means. The receiver component comprises of a means for receiving generated signals, a second signal generation means and an indicating means for indicating that the equipment part being serviced is in an optimal position.

It is also an object of the present invention to provide a system and apparatus that would improve safety during the servicing of heavy equipment or parts thereof.

It is another object of the present invention to provide a system and apparatus that accurately determines when the equipment part being serviced is in an optimal position for servicing.

It is yet another object of the present invention to provide a system and apparatus that eliminates the need for manual assistance in determining the serviced equipment's optimal position for servicing heavy equipment, machines or parts thereof.

Further features and advantages of the present invention as well as the structure and operation of various embodiments of the present invention are described in detail below with reference to the detailed description, the accompanying drawings and the claims.

BRIEF DESCRIPTION OF THE DRAWINGS

A more complete understanding of the present invention may be derived by referring to the detailed description and claims when considered in connection with the Figures, wherein like reference numbers refer to similar items throughout the Figures.

DETAILED DESCRIPTION

The present invention is now described in more detail herein in terms of a system and apparatus for servicing equipment or parts thereof. This is for convenience only and is not intended to limit the application of the present invention. In fact, after reading the following description, it will be apparent to one skilled in the relevant art(s) how to implement the following invention in alternate embodiments. It is further noted that serviced equipment in the present invention may mean particular portions or parts of equipment, or any combination thereof.

Figures 1A, 1B:
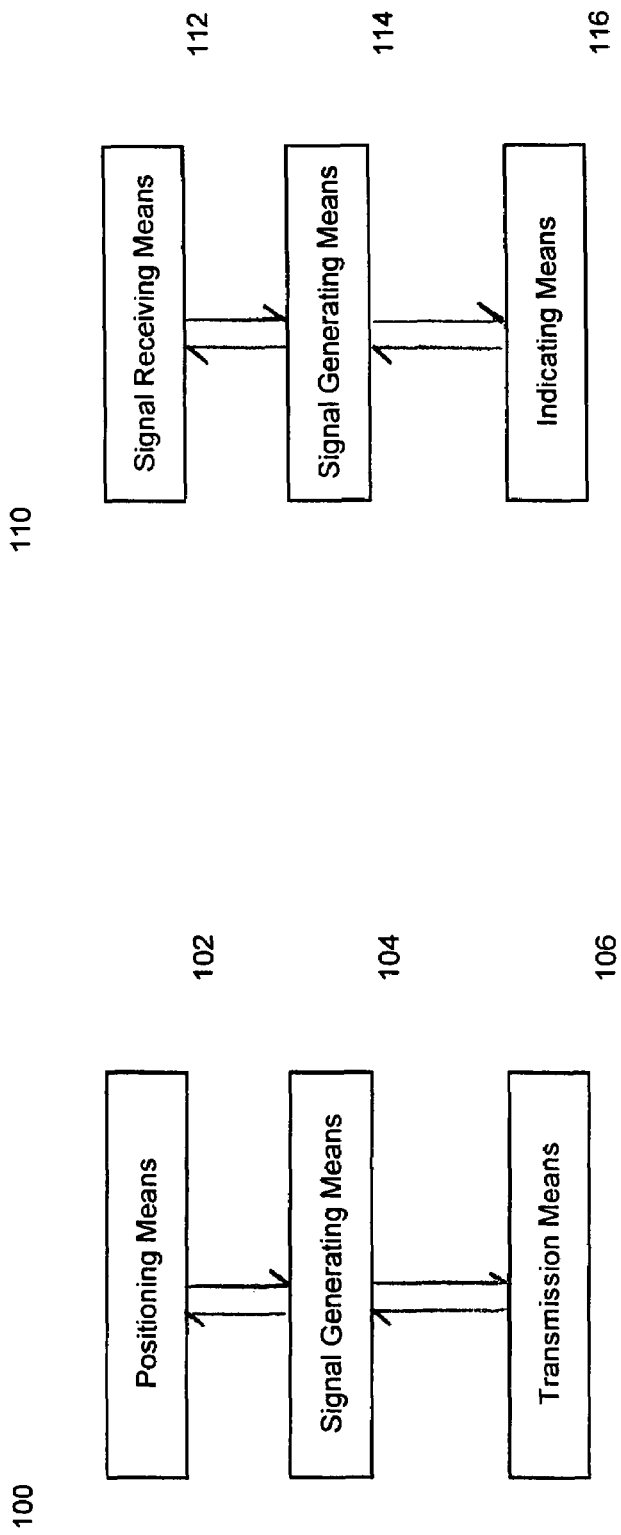
FIG. 1A illustrates a block system diagram showing the transmitter component of the system in accordance with an exemplary embodiment of the present invention.
FIG. 1B illustrates a block system diagram showing the receiver component of the system in accordance with an exemplary embodiment of the present invention.

FIG. 1A illustrates a block system diagram of the transmitting component 100 of the system in accordance with an exemplary embodiment of the present invention. The transmitting component 100 of the system is shown with position determining means 102, a first signal generation means 104 in communication with the position determining means, and transmission means 106 in communication with the first signal generation means. These elements of the transmitting component 100 may be in communication with each other in a variety of ways known to those of ordinary skill in the art including, wired, hard-wired connections, or wireless connections. In one exemplary embodiment of the present invention, the three elements of the transmitting component 100 form one complete electrical circuit where the signal generation means 104 comprises a circuit that is energized by a signal or a closed circuit formed by the position determining means 102. In another embodiment, the respective elements of transmitting component 100 and receiving component 110 may have two-way communication paths between them to allow for the exchange of signals, or data between the elements.

In one embodiment according to the present invention, the transmitting component may be enclosed in a compartment (not shown), which may be attached or fixed onto the serviced equipment. The compartment may have attachment means for attaching the transmitter component onto the serviced equipment. In one embodiment of the present invention, such attachment means may be magnets, which ensure attachment of the transmitter component on a metallic surface of the serviced equipment. In another embodiment, the transmitting component 100 of the system and apparatus may also comprise of a visible pointer which necessarily must be aligned with the manufacturer's marker on the wheel when the transmitting component 100 is being attached (within or without the compartment) to the serviced equipment. In effect, the pointer of the transmitting component 100 functions to track the manufacturer's marker. In one embodiment, the pointer may be represented by, without limitation, an leveling device, a mark on the compartment or any other means as known by those of ordinary skill in the art. As the wheel rotates the transmitting component 100 has a reference point for the manufacturer's marker and is able to send a transmission to the receiving component as to the location of the manufacturer's marker. Thus, as envisioned in the present invention, the transmission component 100 may then be lined up with the surface of the equipment in order to detect the optimal position for servicing.

Figure 2:
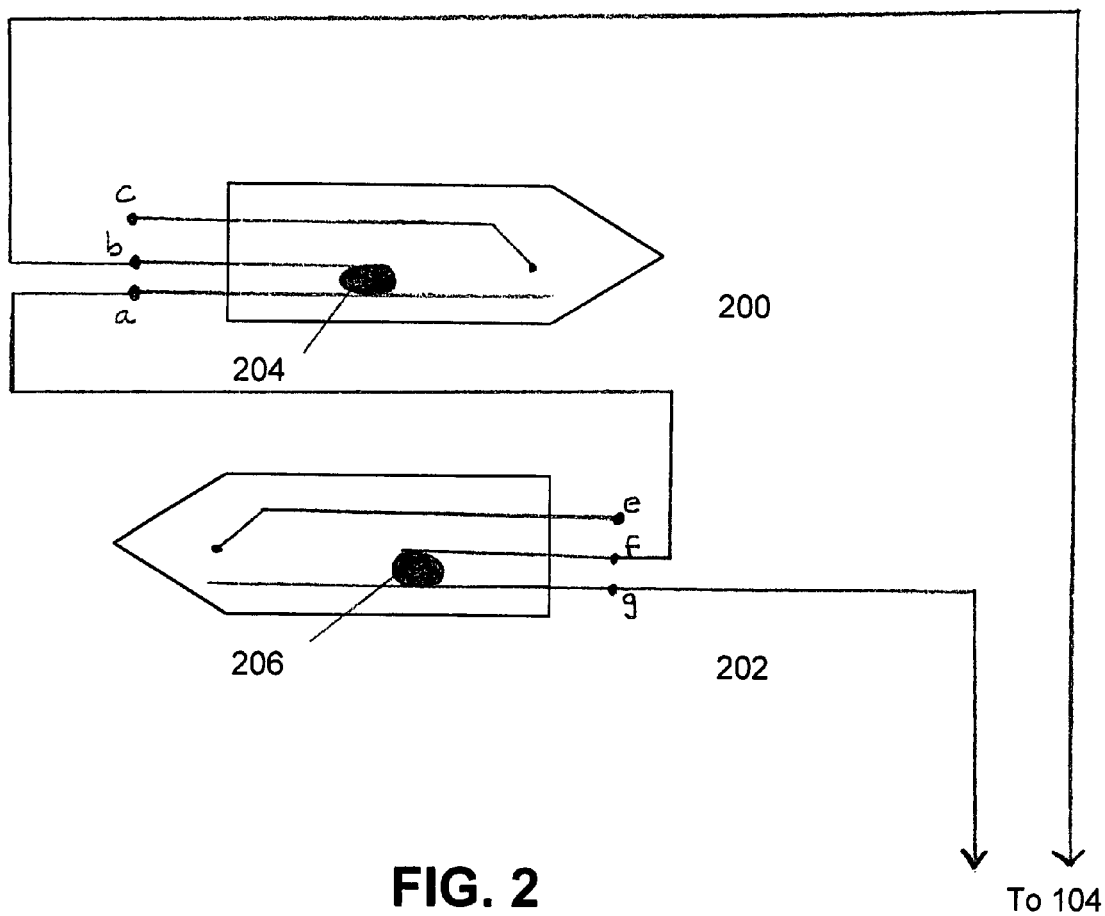
FIG. 2 illustrates a set of liquid mercury switches in accordance with an exemplary embodiment of the present invention.

In a preferred embodiment of the present invention, position determining means 102 of the transmitting component comprises of liquid mercury switches as shown in FIG. 2. Switches 200 and 202 are designed to determine when the serviced equipment is, for example, horizontal or level or parallel with the ground. Liquid mercury switches 200 and 202 form a closed circuit when both switches are horizontal or level with the ground. As such, when the liquid mercury bubbles 204 & 206 in switches 200 and 202 make contact with contact points a & b and f & g of switches 200 and 202 respectively, a closed circuit is created and signal generation means 104 detects the current flow. Once a closed circuit is formed, signal generation means 104 generates a signal, which is transmitted to the receiving component of the system via transmission means 106. When, however, the mercury bubbles 204 & 206 in liquid mercury switches 200 and 202 respectively make contact with contact points a & c and e & g of switches 200 and 202 respectively (or fail to make contact with contact points a & b and f & g of switches 200 and 202 respectively), an open circuit exists and no current flows thus no signal generation by signal generation means 104. This occurs when the transmitting component is attached to the serviced equipment and the serviced equipment is not horizontal with the ground. alternate embodiments may comprise of multiple sets of switches as described above arranged in different configurations.

In an alternate embodiment, signal generation means 102 may be powered by a power source (not shown) along with a switch (also not shown). The switch may be used to power down the system once the serviced equipment is in its optimal position.

FIG. 1B illustrates a block system diagram of the receiving component in accordance with an exemplary embodiment of the present invention. The receiving component 110 comprises of signal receiving means 112 which is configured and designed to receive the signal sent from transmission means 106 of the transmitting component 100. Signal receiving means 112 may communicate with transmission means 106 in a variety of ways known to those of ordinary skill in the art including wireless transmission, wired connections etc. Signal receiving means 112 is in further communication with a second signal generation means 114. Signal generation means 114 may be a frequency generator or a simple circuit that allows current flow once it receives a signal from signal receiving means 112. In a further embodiment, the transmission means 106 and signal receiving means 112 may be antennae or the like.

Upon receipt of a signal from signal receiving means 112, second signal generating means 114 then sends a signal to indicating means 116. In one embodiment, second signal generation means 114 may be an electrical circuit that effectuates current flow or is energized once signal receiving means 112 sends a signal to second signal generation means 114. Indicating means 116 may be an audio device including, without limitation, a horn, an alarm etc. or a visual device, which may include, without limitation, lighting displays, LED lights etc.

Figure 3A:
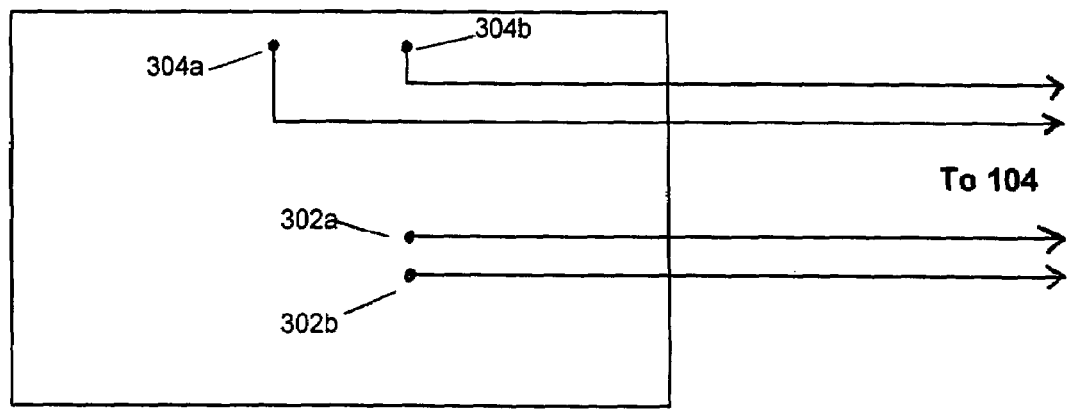
FIGS. 3A & 3B illustrate a pendulum switch system in accordance with an exemplary embodiment of the present invention.
Figure 3B:
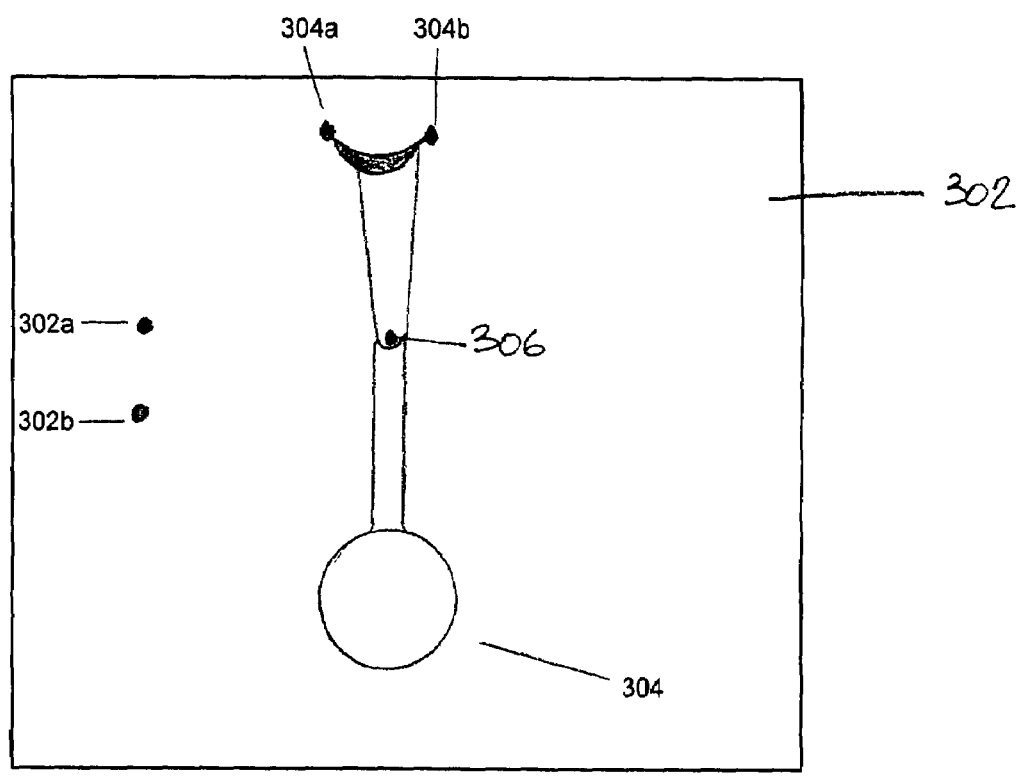

FIGS. 3A & 3B illustrate a pendulum switch system used as the positioning means 100 in accordance with an exemplary embodiment of the present invention. FIG. 3A shows the rear of the pendulum switch system while FIG. 3B shows the front of the system. Pendulum 304 is designed to remain in a vertical position at all times and has a pivot point 306 around which to rotate. The pendulum switch system comprises of contact points 302a, 302b, 304a and 304b. Contact points 302a and 302b reside on a rotary portion 302 of the pendulum switch system while contact points 304a and 304b are on the upper portion of the pendulum 304. These contact points complete a circuit when they are in contact with one another i.e. when the transmitting component 100 is in the horizontal position. When the pendulum is in the vertical position (as shown), contact points 304a and 304b connect with contact points 302a and 302b when the rotary portion 302 rotates around pivot point 306 into a position level or parallel to the ground. The contact points are in communication with the signal generation means 104 of the transmitting component 100. When contact points 302a, 302b, 304a and 304b contact a closed circuit is created, which enables or energizes signal generation means 104 to generate and transmit a signal to the receiving component 110.

Because each piece of equipment may have different optimal positions for servicing, position determining means 102 may be designed to detect a variety of optimal servicing positions. In an alternate embodiment, the system according to the present invention may comprise of a computer system including a memory device (which may be programmable), which will detect when the transmitter component is in an optimal position for the designated machine or equipment being serviced. The memory device will be capable of holding numerous data for various types of equipment. In one embodiment, an operator or mechanic will identify what type of equipment is being serviced after which the system will check to see if the memory device holds relevant data for the equipment e.g. optimal servicing position, recommended lubricating fluid levels, etc. If the memory device does not hold data for the designated or inputted equipment, the operator will be prompted to provide such data. If the data already resides on the memory device, the system will then proceed to determine the optimal position of the equipment. Once the optimal position is detected as corroborated by the equipment's data resident on the memory device, the positioning means will then energize the signal generation means and subsequently the receiver component which then indicates that the optimal position of the equipment has been attained.

Although this present invention has been disclosed with reference to specific forms and embodiments, it will be evident that a great number of variations may be made without departing from the spirit and scope of the present invention. For example, parts or steps may be reversed, equivalent elements may be substituted for those specifically disclosed, and certain features of the present invention may be used independently of other features all without departing from the present invention as defined in the appended claims.

What is claimed is:

1. A system for servicing equipment comprising:
   a. a transmitter component, wherein the transmitter component comprises of
      i. position determining means for determining an optimal position of the serviced equipment wherein the position determining means comprises of a rotary portion having a first set of electrical contact points, the rotary portion being adapted to rotate about a pivot point, wherein the position determining means further comprises a pendulum portion which pivots about the pivot point and comprises of a second set of electrical contact points, the second set of electrical contact points being adapted to make contact with the first set of electrical contact points when the serviced equipment has moved into the optimal position;
      ii. a first signal generation means, in communication with the position determining means, for generating a signal in response to the optimal position as detected by the position determining means when the first and second sets of electrical contacts make contact;
      iii. transmission means, in communication with the first signal generation means, for transmitting the signal generated by the signal generation means;
   b. a receiver component, wherein the receiver component comprises of
      i. signal receiving means for receiving the signal transmitted by the transmission means.

2. The system according to claim 1 further comprising a second generation means, in communication with the signal receiving means and for transmitting a signal.

3. The system according to claim 2 further comprising indicator means, in communication with the second signal generation means, for indicating the optimal position of the device.

4. The system according to claim 1 wherein the transmitting component is enclosed in a case.

5. The system according to claim 4, wherein the case comprises of placement means for placing the case on serviced equipment.

6. The system according to claim 5, wherein the placement means comprises of magnets.

7. A system for servicing equipment comprising:
   a. a transmitter component, wherein the transmitter component comprises of
      i. position determining means for determining an optimal position of a serviced equipment wherein the position determining means comprises of at least two mercury switches wherein the mercury switches are adapted to form a closed circuit when both switches are horizontal or level with the ground;
      ii. a first signal generation means, in communication with the position determining means, for generating a signal in response to the optimal position as detected by the position determining means when the serviced equipment has moved into the optimal position and both mercury switches are horizontal or level with the ground;
   b. transmission means, in communication with the first signal generation means, for transmitting the signal generated by the signal generation means; a receiver component, wherein the receiver component comprises of
      i. signal receiving means for receiving the signal transmitted by the transmission means.

8. The system according to claim 7 further comprising second signal generation means, in communication with the signal receiving means, for receiving at least a signal from the signal receiving means and for transmitting a signal.

9. The system according to claim 8 further comprising indicator means, in communication with the second signal generation means, for indicating the optimal position of the device.

10. The system according to claim 7 wherein the transmitting component is enclosed in a case.

11. The system according to claim 7, wherein the case comprises of placement means for placing the case on serviced equipment.

12. The system according to claim 11, wherein the placement means comprises of magnets.

* * * * *